United States Patent [19]
Zievers et al.

[11] Patent Number: 5,500,029
[45] Date of Patent: Mar. 19, 1996

[54] FILTER ELEMENT AND METHOD OF MANUFACTURE

[75] Inventors: James F. Zievers; Elizabeth C. Zievers, both of La Grange; Peter Aguilar, Forest View; Paul Eggerstedt, Plainfield, all of Ill.

[73] Assignee: Industrial Filter & Pump Mfg. Co., Cicero, Ill.

[21] Appl. No.: 232,481

[22] Filed: Apr. 25, 1994

[51] Int. Cl.$^6$ .................................................. B01D 46/24
[52] U.S. Cl. ........................... 55/485; 55/487; 55/523; 55/524; 55/DIG. 5; 264/62
[58] Field of Search .......................... 55/302, 514, 523, 55/524, 527, DIG. 5, 485–489; 264/62–64

[56] References Cited

U.S. PATENT DOCUMENTS

| | | | |
|---|---|---|---|
| 3,535,852 | 10/1970 | Hirs | 55/523 X |
| 3,843,561 | 10/1974 | Sobel | 55/523 X |
| 4,205,971 | 6/1980 | Abthoff et al. | 55/523 X |
| 4,342,574 | 8/1982 | Fetzer | 55/523 X |
| 4,398,931 | 8/1983 | Shevlin | 55/523 X |
| 4,478,618 | 10/1984 | Bly et al. | 55/523 X |
| 4,543,113 | 9/1985 | Forester et al. | 55/523 X |
| 4,829,766 | 5/1989 | Henkel | 55/523 X |
| 4,888,114 | 12/1989 | Gaddis et al. | 55/523 X |
| 4,968,467 | 11/1990 | Zievers | 55/523 X |
| 4,979,969 | 12/1990 | Herding | 55/523 |
| 5,039,413 | 8/1991 | Harwood et al. | 55/524 X |
| 5,071,457 | 12/1991 | Schmidt, Jr. et al. | 55/524 X |
| 5,087,277 | 2/1992 | Gonzalez et al. | 55/524 X |
| 5,171,341 | 12/1992 | Merry | 55/523 X |
| 5,174,969 | 12/1992 | Fischer et al. | 55/523 X |
| 5,223,138 | 6/1993 | Zievers et al. | 55/523 X |
| 5,230,726 | 7/1993 | Smith et al. | 55/DIG. 5 |
| 5,238,478 | 8/1993 | Zievers et al. | 55/523 |
| 5,248,481 | 9/1993 | Bloom et al. | 55/523 X |
| 5,258,164 | 11/1993 | Bloom et al. | 55/527 X |
| 5,266,279 | 11/1993 | Haerle | 55/523 X |

FOREIGN PATENT DOCUMENTS

| | | | |
|---|---|---|---|
| 4141580 | 6/1993 | Germany | 55/523 |

*Primary Examiner*—Robert Spitzer
*Attorney, Agent, or Firm*—Patnaude, Videbeck & Marsh

[57] ABSTRACT

A unitary candle filter employs a wrapping of continuous filamentary ceramic material in the form of a yarn or twine wrapped over a porous ceramic support tube to hold the support structure intact during a high pressure backwash operation. A thin filtering layer of a ceramic material is deposited over the support structure and the wrapping is embedded in the filtering layer.

20 Claims, 2 Drawing Sheets

FILTER ELEMENT AND METHOD OF MANUFACTURE

The present invention relates in general to the art of gas filtration, and it relates in particular to a new and improved filter element and to a method of manufacturing such element.

BACKGROUND OF THE INVENTION

Ceramic filter candles are tubular filter elements closed at one end and are well known for use in removing particulates from hot gasses in which such particulates are entrained. Such filter elements as known in the prior art have included a porous ceramic tubular support structure having a less porous skin provided on the outer surface thereof for capturing particulates on the outer portion of the skin as a particulate laden gas passes from the outside to the inside of the element through the skin and the underlying support structure. During such use particulates collect on the outer surface of the element and form a porous cake which adheres to the exterior of the filter element. When the thickness of the cake becomes so great as to affect adversely the efficient operation of the associated filter, the cake must be removed in a cake removal operation. In one such cake removal operation known as a back wash, the flow of gas through the wall of the filter element is reversed so that the gas passes from the inside of the element to the outside and physically blows the cake from the external portion of the filter element where it has collected.

Inasmuch as ceramic filter elements are at times weak in tensile strength, the pressure differential applied across the wall of the filter element during the backwash cleaning operation must be maintained below that value which would result in the eruption or cracking of the filter element, and that pressure is oftentimes less than that which would otherwise be used for the quickest and most efficient cleaning of the filter element. Also, ceramic filter elements of the tubular or candle type known in the prior art are relatively fragile and must, therefore, be handled very carefully during shipment and storage and during installation in a filter tank or the like.

It would be desirable, therefore, to provide a gas filter element which is able to withstand the high temperatures generally encountered in high temperature gas filtration, which is generally stronger and less susceptible to breakage during normal handling, and which is appreciably stronger in tensile strength than are the filter elements known in the prior art so as to enable the use of higher pressure differentials during a high pressure back wash operation.

SUMMARY OF THE INVENTION

Briefly, the present invention provides for a unitary ceramic filter element which may be generally tubular in shape, and which incorporates a porous ceramic support structure around the external surface of which is provided a wrapping of a strong ceramic filament member. Preferably, the wrapping material is a yarn-like or twine-like material formed of a plurality of continuous strands or filaments of a ceramic material twisted together into an elongate flexible ceramic yarn or twine. A thin layer or skin of a fine porous ceramic overlies the support structure and the ceramic wrapping to provide the media on and in which the particulates entrained in a gas being passed through the wall of the element are collected. Both the filament wrapping and the outer skin are integrally bonded to the support structure to form a unitary filter element. The ceramic filament wrapping, being very strong in tension, prevents the support structure from expanding and breaking when a high pressure differential is applied between the inside and the outside of the filter element during a filter cleaning operation. In addition, the filament wrapping increases the resistance of the filter element to breakage during manufacture, shipping, storage, and installation in a filter tank or the like.

In a preferred embodiment of the invention, the wrapping is tightly wound onto a porous ceramic support tube and the outer skin is then deposited onto the support structure over the wrapping. The wrapping and the outer skin are then bonded to the support structure in a high temperature firing operation.

In the preferred embodiment of the invention, the tubular filter element is closed at one end by a non-porous ceramic plug and a tubular ceramic capping assembly is a densified, substantially non porous ceramic material and are bonded to the underlying support structure, the wrapping, and the outer skin by a high temperature cement in a high temperature firing operation to provide a unitary filter candle.

BRIEF DESCRIPTION OF THE DRAWINGS

A better and more complete understanding of the present invention may be had from a reading of the following detailed description taken in connection with the drawings wherein.

DETAILED DESCRIPTION OF THE INVENTION

Figure 2:
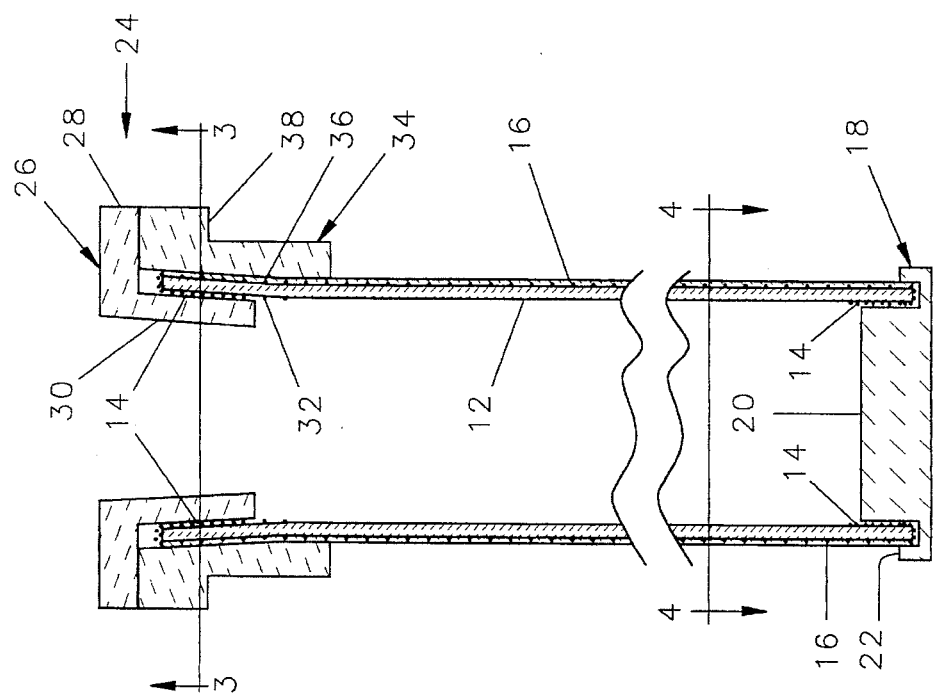
FIG. 2 is a longitudinal cross-sectional view of the upper end of the filter candle shown in FIG. 1.

Referring to the drawings, there is shown a filter element in the form of a generally tubular candle 10 which is open at the top and sealably closed at the bottom. The intermediate portion of the candle is porous, and during use of the candle, a gas in which particulate material is entrained is passed through the wall of the candle from the outside to the inside to cause particulates having a size greater than that of the pores of the wall of the intermediate section to be captured and deposited as a filter cake on the outer portion of the candle.

The filter candle 10 comprises as its principal elements a porous tubular support tube 12 which is molded of a plurality of ceramic fibers and a binder and then fired to become a rigid porous member. This operation may be carried out by pulling a slurry of the fibers and the binder against a mold surface by means of a vacuum. The support tube has relatively coarse pores in the range of about 60 to 150 microns. More particularly, after the tube 12 is first molded and before drying, the upper end is flared outwardly to the shape shown in FIG. 2 and then the tube is air dried. The dried tube is then post treated with a suitable colloid such as $SiO_2$, $Al_2O_3$, or Mullite to increase the strength of the tube 12. The amount of colloid which is added to the tube at this time should be sufficient to increase the weight of the tube by between four and twenty percent. The tube 12 is then cured in a high temperature firing operation at a temperature of about 1800 degrees F. If desired, additional colloids may be applied to the tube at this time and the tube may again be dried and fired.

A twine-like wrapping 14 of continuous ceramic filimentary material is then tightly fitted over the outer surface of the tube 12. One such suitable ceramic filamentary material is available commercially from the Minnesota Mining and Manufacturing Company under the trade name Nextel yarn. The wrapping 14 in the illustrated embodiment of the invention consists of a net-like double helix which is tightly wound onto the outer surface of tube 12 first in one direction and then in the other in a counter winding operation. Other arrangements such as a braid or a pre-formed tubular net of the filamentary material can be fitted onto the tube 12 where that procedure is more convenient. Thereafter, the ends of the wrapping are folded back a short distance over the ends of the tube and the ends of the tube are cut off. Then the wrapping is folded back over the ends of the tube 12 into the interior of the tube 12 as shown in FIG. 2. In a preferred embodiment of the invention the wrapping material was relatively thin having a diameter of about two millimeters with the spaces between the wrapping being in the range of six to twenty-five millimeters.

A thin skin or membrane 16 is then applied to the outer surfaces of the tube 12 and over the wrapping 14. The membrane is preferably a coating of ceramic fibers suspended in a colloidal ceramic liquid which is applied in the form of a slurry by any suitable means such as brushing, dipping, or spraying. The dimensions of the fibers in the coating determine the porosity of the membrane and should be selected to be appropriate for the anticipated use of the filter candle. The thickness of the membrane should be in range of about 0.05 to 0.25 the thickness of the tube 12. After the coating has been applied to the outer surface of the tube 12 and over the wrapping 14 so that the wrapping is embedded in the coating, the entire assembly is again cured in a firing operation at a temperature of about 1800 degrees F.

A bottom end cap 18 which is molded of a densified ceramic so as to be essentially non-porous is fitted to the lower end of the candle as best shown in FIG. 2. The cap 18 may be seen to include a tapered plug portion 20 which tightly fits into the bottom of the tube 12 with the lower end of the tube 12 and the wrapping 14 and the skin 16 being received in an annular groove 22 in the cap 18. The cap 18 is bonded to the remainder of the candle.

Figure 1:
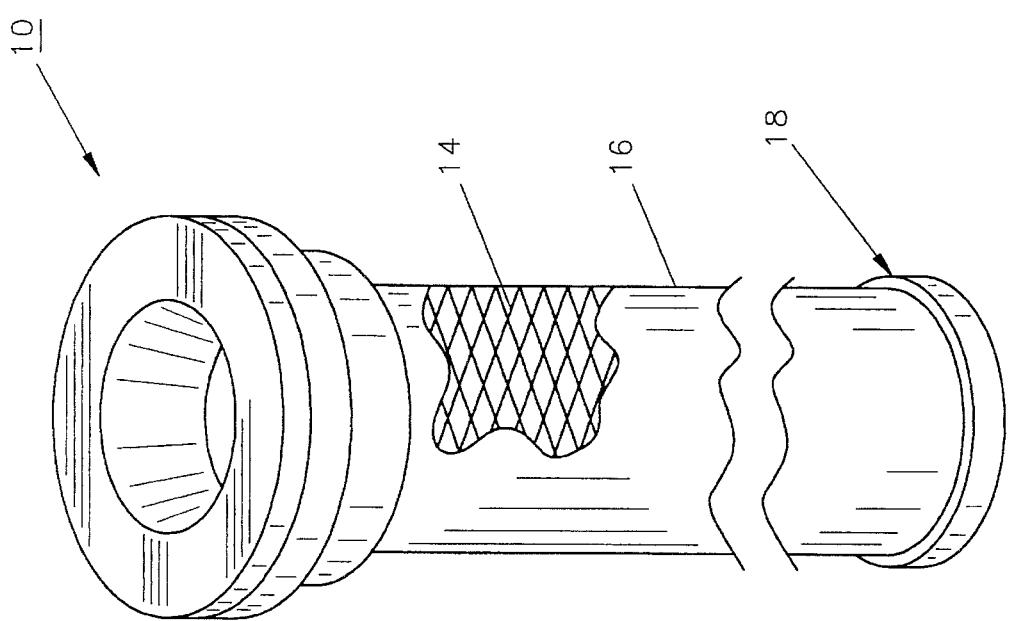
FIG. 1 is an isometric view of a filter candle embodying the present invention, a portion of the outer surface being broken to show the interior of the candle.
Figure 4:
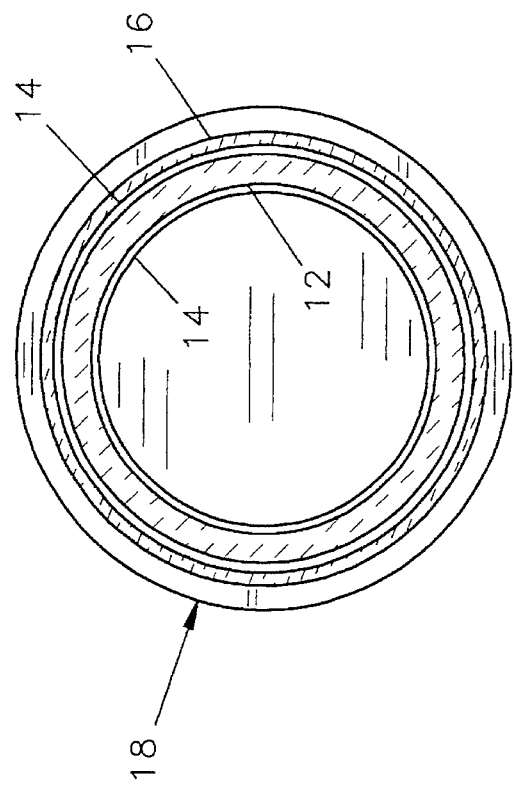
FIG. 4 is a cross-sectional view taken along the line 4—4 of FIG. 2, assuming the entire filter candle to be shown therein.
Figure 3:
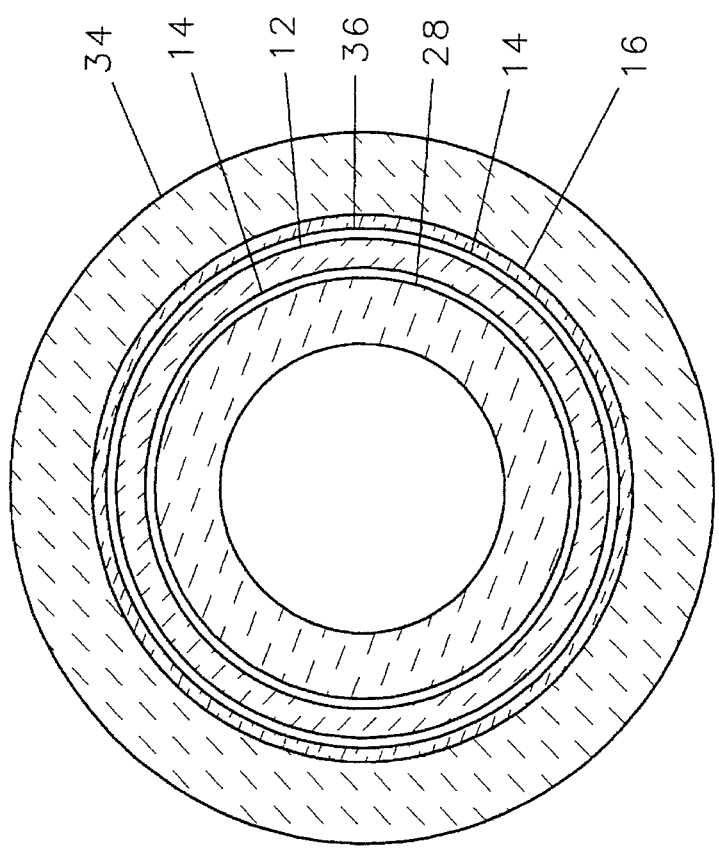
FIG. 3 is a cross-sectional view taken along the line 3—3 of FIG. 2, assuming the entire filter candle to be shown therein.

The upper end of the candle includes a mounting assembly 24 for use in mounting the candle to a tube sheet in a filter tank. The mounting assembly 24 may be best seen in FIGS. 1 and 2 to include a tubular plug member 26 shaving a flat ring portion 28 and a depending frustoconical tubular central portion 30. The outer surface of the central portion 30 is complementary to the inner surface of the upper flared out portion 32 of the tube assembly, and a locking ring 34 having an upper inner surface 36 which is complementary to the outer surface of the upper flared out portion 32 of the tube assembly fits tightly against the upper end portion of the tube 60 assembly and against the lower annular surface of the plug member 26. The locking ring 34 has a downwardly facing annular shoulder 38 which is adapted to rest on the upper surface of a conventional tube sheet in a filter tank during use of the candle. The entire mounting assembly 24 is cemented together and to the tube assembly so that the candle 10 is a unitary, ceramic member.

There is thus provided a novel filter element and method of manufacturing the element. The support structure has a high compressive strength which is required to withstand the high pressure differential which is exerted on the candle during use thereof as the gas to be cleaned is forced from the exterior to the interior of the candle through the wall thereof. The outer membrane 16 provides the filter media which captures particulates entrained in the gas being cleaned with the tube 12 and the wrapping 14 providing the support for the membrane 16. The filamentary wrapping 14 provides the necessary strength to hold the support tube 12 intact during a high pressure backwash operation and also decreases the fragility of the candle so as to reduce damage thereto during manufacture, handling, storage, and installation.

The mounting assembly including the flared out upper portion of the tube assembly 24 with the complementary parts 26 and 34 provides a sturdy mount for the candle and eliminates the need for separate sealing gaskets or the like between the tube assembly and the mounting assembly.

While the present invention has been described in connection with a particular embodiment thereof, it will be understood that those skilled in art may make many changes and modifications without departing from the true spirit and scope of the invention. Therefore, it is intended by the appended claims to cover all such changes and modifications which come within the true spirit and scope of the invention.

What is claimed:

1. A filter element, comprising in combination a porous ceramic support structure, a filamentary covering disposed over one surface of said support structure, and a thin ceramic skin enclosing said covering and said one surface, said skin having a finer porosity than that of said support structure, and said support structure, said filamentary covering, and said skin being bonded together to form a unitary member.

2. A filter element according to claim 1 wherein said support structure is tubular.

3. A filter element according to claim 2 comprising means closing one end of said tubular support structure; and a tubular ceramic mounting assembly attached to the other end of said tubular support structure.

4. A filter element according to claim 3 wherein said mounting assembly comprises, a generally tubular plug fitted into said other end of said tube, and a locking ring fitted over the exterior of said tube and compressing the other end of said tubular support structure between said plug and said locking ring.

5. A filter element according to claim 4 wherein said tubular support structure is generally cylindrical, and said other end of said tubular support structure is flared outwardly.

6. A candle-type filter element, comprising in combination a porous ceramic tubular support structure, a covering of continuous strands of ceramic helically wrapped over the external surface of said support structure, a thin ceramic porous filtering layer having a porosity less than that of said support structure enclosing said covering and enclosing said external surface, and said support structure, said covering and said filtering layer being mutually bonded together to form a unitary filter candle.

7. A filter candle according to claim 6, comprising a generally tubular plug fitted into one end portion of said tubular support structure, and a locking ring fitted over the exterior of said tubular support structure and compressing said one end of said tubular support structure between said plug and said locking ring.

8. A filter candle according to claim 7 wherein said tubular support structure is generally cylindrical, and said one end of said tubular support structure is flared outwardly.

9. A filter element, comprising in combination a porous ceramic support structure, a filamentary covering disposed over one surface of said support structure, a ceramic skin enclosing said covering and said one surface, and said support structure, said filamentary covering, and said skin being bonded together to form a unitary member.

10. A filter element according to claim 9 wherein said support structure is tubular, and said filamentary covering defines a tubular net surrounding said one surface of said support structure.

11. A filter element according to claim 10, comprising means closing one end of said tubular support structure, and a tubular ceramic mounting assembly attached to the other end of said tubular support structure.

12. A filter element according to claim 11 wherein said mounting assembly comprises, a generally tubular plug fitted into said other end of said tubular support structure, and a locking ring fitted over the exterior of said tubular support structure and compressing said other end of said tube between said plug and said locking ring.

13. A filter element according to claim 12 wherein said tubular support structure is generally cylindrical, and said other end of said tubular support structure is flared outwardly.

14. A filter element according to claim 9 wherein said ceramic skin includes a plurality of ceramic fibers suspended in a colloidal ceramic liquid.

15. A filter element according to claim 9 wherein said filamentary covering defines a net positioned over said one surface of said support structure.

16. A method of making a filter candle, comprising the steps of forming a porous tubular member of ceramic fibers and a binder, drying said tubular member, and then treating said tubular member with a ceramic colloid material to increase the weight of the tubular member by between four percent and twenty percent, and then curing said tubular member at a temperature of about 1800 degrees F. or more.

17. A method according to claim 16, comprising the additional steps of again treating said tubular member with a ceramic colloid material, and curing the again treated tubular member.

18. A method of making a filter element, comprising the steps of forming a porous tubular member from ceramic fibers and a binder, drying said tubular member, enclosing the outside surface of said tubular member with a continuous filamentary material, and curing said tubular member and said filamentary material.

19. A method of making a filter element according to claim 11, comprising the additional step of coating said outside surface and said filamentary material with a colloidal ceramic material to provide a porous layer over said tubular member and said filamentary material, and the step of curing of said tubular member and said filamentary material includes the step of:

curing said coating to form a unitary member.

20. A method of making a filter candle assembly having ceramic material therein including ceramic fibers, ceramic yarn and a colloid of ceramic material, said method comprising the steps of vacuum forming a porous tube of ceramic fibers, said tube having a thickness in the range of 60 to 150 microns, drying said tube, treating said tube with a colloid of a ceramic material to increase the weight of said tube by between four percent and twenty percent, heating said tube to set said tube and said colloid, wrapping said tube with a ceramic yarn, coating said yarn and said tube with a colloidal ceramic in which ceramic fibers are suspended to provide a ceramic layer having a thickness between about 0.05 and 0.25 times the thickness of said tube, and, curing the assembly to set said ceramic fibers and said ceramic material therein.

* * * * *